US005664416A

United States Patent [19]

Sangret

[11] Patent Number: 5,664,416

[45] Date of Patent: Sep. 9, 1997

[54] FILLING A VEHICLE POWER STEERING SYSTEM

[75] Inventor: Henry C. Sangret, St. Clair Shores, Mich.

[73] Assignee: TRW Inc., Lyndhurst, Ohio

[21] Appl. No.: 608,408

[22] Filed: Feb. 28, 1996

[51] Int. Cl.$^6$ .................... F16D 31/02

[52] U.S. Cl. .................... 60/327; 60/453

[58] Field of Search .................... 60/327, 453

[56] References Cited

U.S. PATENT DOCUMENTS

| | | | |
|---|---|---|---|
| 4,454,717 | 6/1984 | Wade et al. | 60/453 |
| 4,869,346 | 9/1989 | Nelson . | |
| 5,056,621 | 10/1991 | Trevino . | |
| 5,056,622 | 10/1991 | Vermeulen . | |
| 5,291,968 | 3/1994 | Brown . | |

FOREIGN PATENT DOCUMENTS

| | | | |
|---|---|---|---|
| 2221551 | 11/1973 | Germany | 60/453 |
| 193902 | 11/1983 | Japan | 60/453 |

*Primary Examiner*—F. Daniel Lopez

*Attorney, Agent, or Firm*—Tarolli, Sundheim, Covell, Tummino & Szabo

[57] ABSTRACT

A connector assembly (76) connects a power steering fluid reservoir (18) on a vehicle (10) with a bulk holding tank (44) for power steering fluid (46). Upon initiation of the operation of a vehicle engine (16), a control valve (56) is opened to enable power steering fluid (46) to flow from the bulk holding tank (44) through the connector assembly (76) into the reservoir. Operation of a power steering pump (14) on the vehicle (10) causes power steering fluid to flow from the reservoir (18) through the power steering pump (14) and reservoir (18) to the bulk holding tank through return conduits (22, 110, and 78). Air is entrained in the flow of fluid in the return conduits (22, 110 and 78). A vacuum pump (86) is advantageously connected with the bulk holding tank (44) to promote removal of air from the power steering fluid (46) returned to the bulk holding tank.

9 Claims, 2 Drawing Sheets

FILLING A VEHICLE POWER STEERING SYSTEM

BACKGROUND OF THE INVENTION

The present invention relates to a new and improved method and apparatus for use in purging air from a power steering system and filling the power steering system with power steering fluid.

At the end of an assembly line on which vehicles are constructed, a power steering system on a vehicle is filled with power steering fluid. This is done by conducting a flow of power steering fluid into a reservoir in the power steering system. When the power steering system is filled with power steering fluid in this manner, air in the power steering pump and associated conduits becomes entrained in the power steering fluid.

The air entrained in the power steering fluid may cause unwanted noise and/or vibration during an initial portion of the operating life of the vehicle. This noise and vibration may be annoying to a driver of the vehicle. In addition, the noise and vibration may result in misdiagnoses of and/or the missing of problems with the power steering system.

SUMMARY OF THE INVENTION

The present invention provides a new and improved method of filling a vehicle power steering system with fluid. When a vehicle has been assembled and the power steering system is to be filled with power steering fluid, a connector assembly is inserted into a reservoir in the power steering system. As the connector assembly is inserted into the reservoir, a return conduit in the connector assembly is moved into sealing engagement with an opening through which power steering fluid from the power steering pump enters the reservoir.

Operation of the vehicle engine is then started and a valve which controls a flow of power steering fluid through the connector assembly is opened. This results in a flow of power steering fluid through the connector assembly into the reservoir. Since the power steering pump is being driven by the engine, the power steering pump induces a flow of power steering fluid from and to the reservoir.

The power steering fluid conducted from the power steering pump back to the reservoir contains air purged from the power steering pump and the conduit associated with the power steering pump. The power steering fluid and the entrained air are conducted through the reservoir in the return conduit in the connector assembly. The flow of power steering fluid and entrained air is conducted from the connector assembly to a holding tank. A vacuum pump connected with the holding tank promotes removal of the entrained air from the power steering fluid returned to the tank.

BRIEF DESCRIPTION OF THE DRAWINGS

The foregoing and other objects and features of the present invention will become more apparent to one skilled in the art to which the present invention relates upon consideration of the following description of the invention with reference to the accompanying drawings, wherein.

DESCRIPTION OF ONE SPECIFIC PREFERRED EMBODIMENT OF THE INVENTION

Apparatus

Figure 1:
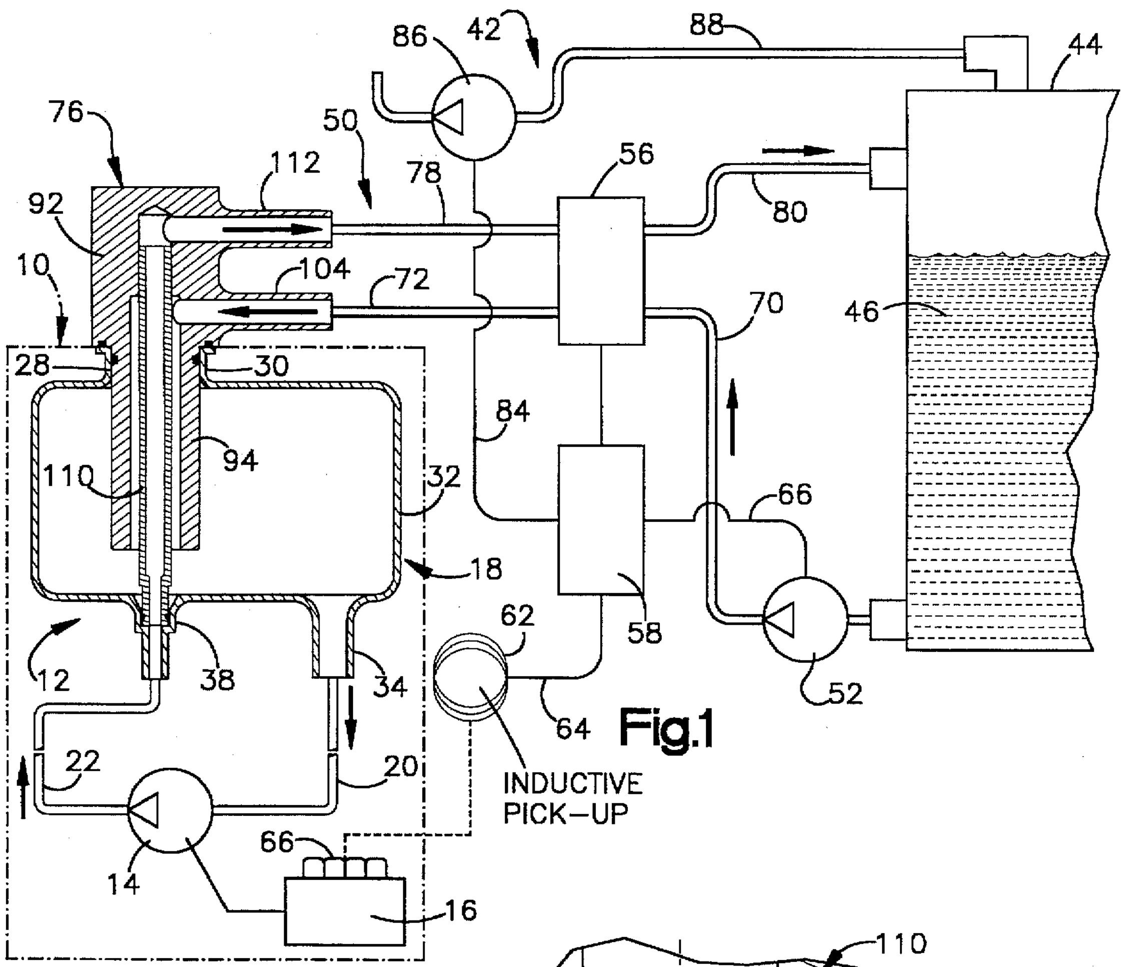
FIG. 1 is a schematic illustration depicting a system which is used to fill a power steering system in a vehicle with power steering fluid.

A vehicle 10 is illustrated schematically in FIG. 1. The vehicle 10 has a power steering system 12 which has a known construction and is used to turn steerable vehicle wheels. The power steering system 12 includes a power steering pump 14 which is driven by an engine 16 during operation of the vehicle 10. The power steering pump 14 is supplied with power steering fluid from a reservoir 18 through a supply conduit 20. During operation of the power steering pump 14 and engine 16, power steering fluid is conducted from the power steering pump back to the reservoir 18 through a return conduit 22.

Figure 2:
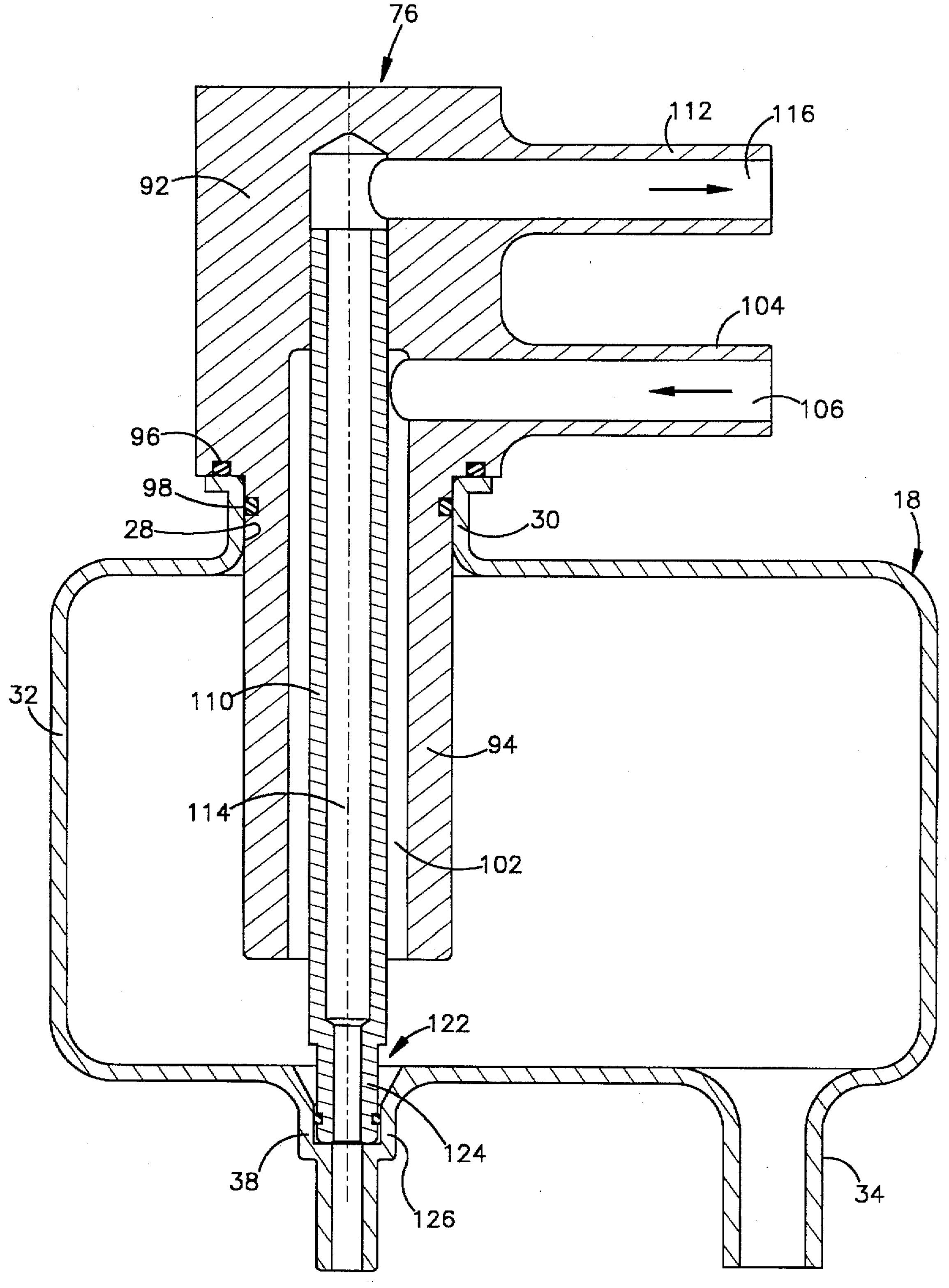
FIG. 2 is an enlarged sectional view illustrating the manner in which a connector assembly in the system of FIG. 1 is connected with a reservoir in a vehicle power steering system.

The reservoir 18 has a fill opening 28 formed in a generally cylindrical neck 30 (FIGS. 1 and 2). The neck 30 is integrally formed as one piece with a tank portion 32 (FIG. 2) of the reservoir 18. The reservoir 18 has an outlet 34 through which power steering fluid is conducted to the supply conduit 20 (FIG. 1) for the power steering pump 14. In addition, the reservoir 18 has a return fluid inlet 38 through which fluid from the return conduit 22 is conducted.

Immediately after a vehicle has been assembled, a filling system 42 (FIG. 1) is used to purge air from the power steering system 12 and to fill the power steering system with power steering fluid. It is contemplated that the filling system 42 will be located at the end of an assembly line on which the vehicle 10 is produced. A bulk holding tank or container 44 (FIG. 1) holds a supply of power steering fluid 46 with which the power steering system 12 on the newly assembled vehicle is to be filled.

A fluid conduit assembly 50 conducts fluid from the bulk holding tank 44 to the power steering system 12 on the vehicle 10. A charge pump 52 is operable to induce a flow of power steering fluid 46 from the bulk holding tank 44 into the fluid conduit assembly 50.

A power steering fluid flow control valve 56 (FIG. 1) is operable between a closed condition blocking fluid flow from the charge pump 52 through the fluid conduit assembly 50 to the reservoir 18 and an open condition enabling fluid to flow through the fluid conduit assembly to the reservoir. The control valve 56 is operable between the open and closed conditions by an electronic control unit 58. The electronic control unit 58 is connected with an inductive pickup 62 by an electrical conductor 64.

The inductive pickup 62 is connected with an ignition system 66 for the engine 16 in the vehicle 10 upon completion of assembly of the vehicle. Upon starting of operation of the engine 16, the inductive pickup 62 provides a signal to the electronic control unit 58.

When the electronic control unit 58 receives a signal from the inductive pickup 62 indicating that the engine 16 has started to operate, the electronic control unit effects operation of the control valve 56 from the closed condition to the open condition. The electronic control unit 58 also effects energization, through a conductor 66, of a motor (not shown) connected with the charge pump 52. Operation of the charge pump 52 results in power steering fluid 46 being conducted through a supply conduit 70 to the control valve 56.

Hydraulic fluid is conducted from the control valve 56 through a supply conduit 72 to a connector assembly 76. The connector assembly 76 interconnects the fluid conduit assembly 50 and the reservoir 18. At the same time, power steering fluid with air entrained therein is conducted from the connector assembly 76 through a return conduit 78 to the control valve 56. The power steering fluid with air entrained therein is conducted from the open control valve 56 through a return conduit 80 to the holding tank 44.

The electronic control unit 58 also energizes an electric motor (not shown) over an electrical conductor 84 (FIG. 1) to drive a vacuum pump 86. The vacuum pump 86 is connected with the upper portion of the bulk holding tank 44 through a conduit 88. Operation of the vacuum pump 86 evacuates or lowers the pressure in the upper portion of the holding tank 44. The pumping of air from the upper portion of the holding tank 44 by the vacuum pump 86 promotes removal of the air from the power steering fluid conducted to the holding tank 44 through the return conduit 80.

The connector assembly 76 includes a connector block 92 (FIG. 2). A cylindrical fill or outer conduit 94 is integrally formed with and extends downward from (as viewed in FIG. 2) the connector block 92. O-ring seals 96 and 98 are provided between the connector block 92 and fill conduit 94 and the neck portion 30 of the reservoir 18 to seal the interconnection between the connector assembly 76 and the reservoir.

The fill conduit 94 has a cylindrical passage 102 (FIG. 2) which is connected in fluid communication with the supply conduit 72 (FIG. 1) by a supply connector stub section 104. The supply connector stub section 104 has a passage 106 (FIG. 2) which interconnects the passage 102 in the fill conduit 94 and the supply conduit 72.

An inner or return conduit 110 is disposed in the passage 102 in the fill conduit 94. The inner conduit 110 extends through the passage 102 into the connector block 92. The cylindrical inner conduit 110 has a central axis which is coincident with the central axis of the fill conduit 94. During filling of the power steering system 12 with fluid 46 from the bulk holding tank 44, power steering fluid is conducted through the passage 102 along the outside of the inner conduit 110 to the reservoir 18. A separate return flow of power steering fluid and air is conducted through the inner conduit 110.

A return connector stub section 112 extends from the connector block 92 to connect the connector block with the return conduit 78 (FIG. 1). A passage 114 (FIG. 2) in the inner conduit 110 is connected in fluid communication with a passage 116 in the return connector stub section 112.

The inner conduit 110 has a connector section 122 (FIG. 2) which sealingly engages the return fluid inlet 38 for the reservoir 18. The connector section 122 has a cylindrical end portion 124 (FIG. 3) which is telescopically received in a cylindrical inlet flange 126 formed in the reservoir 18. An O-ring 128 seals the connection between the connector section 122 of the inner conduit 110 and the inlet flange 126.

Operation

Upon completion of assembly of a vehicle 10 (FIG. 1), the power steering system 12 in the vehicle is empty. However, the power steering system 12 does contain air. In order to eliminate or at least minimize objectionable noise and vibration during operation of the power steering system 12, the air is advantageously purged from the power steering system as it is filled with power steering fluid 46.

In order to fill a power steering system 12 of the newly assembled vehicle 10 with power steering fluid 46 and to simultaneously purge the air from the power steering system

Figure 3:
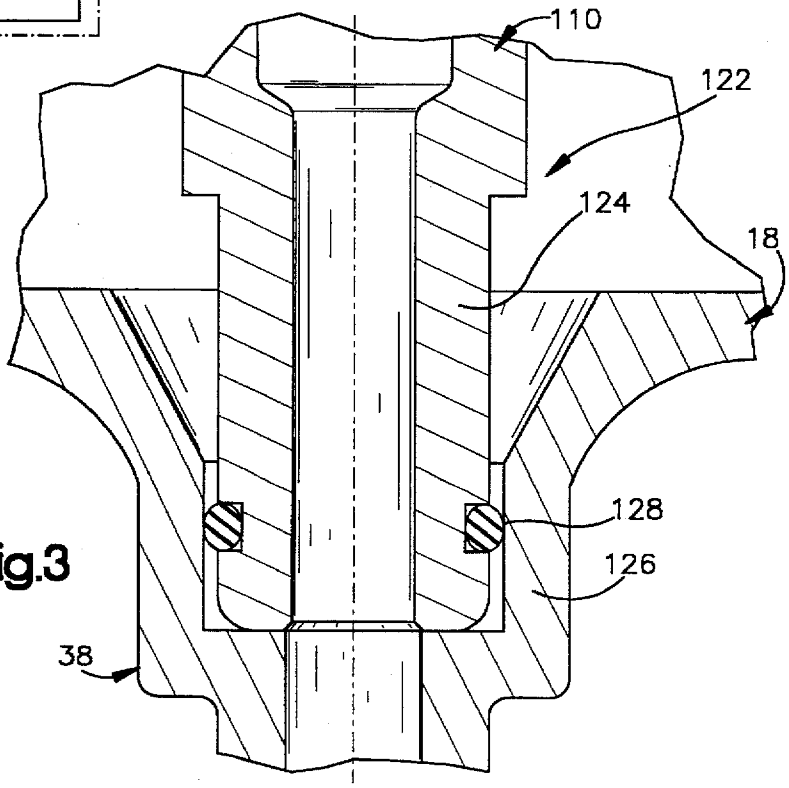
FIG. 3 is an enlarged fragmentary view illustrating the manner in which a return conduit in the connector assembly is connected with a return fluid inlet to the reservoir.

12, the connector assembly 76 is inserted into the reservoir 18 in the vehicle. As the connector assembly 76 is inserted into the empty reservoir 18, the connector section 122 (FIG. 2) of the inner or return conduit 110 moves into sealing engagement with the inlet flange 126 at the return fluid inlet 38 to the reservoir (FIGS. 2 and 3).

In addition, as the connector assembly 76 (FIG. 1) is inserted into the empty reservoir 18, the connector block 92 moves into sealing engagement with the neck 30 of the reservoir. At this time, the control valve 56 is in a closed condition and the charge pump 52 and vacuum pump 86 are not being operated.

The inductive pickup 62 (FIG. 1) is connected with the ignition system 66 of the engine 16. Once the inductive pickup 62 has been connected with the ignition system 66 of the engine 16, the engine is started. When the engine 16 is started, a signal is transmitted from the inductive pickup 62 over the electrical conductor 64 to the electronic control unit 58.

Upon receiving the signal indicating that the engine 16 has been started, the electronic control unit 58 energizes the motors for driving the charge pump 52 and the vacuum pump 86. Immediately thereafter, the electronic control unit 58 effects operation of the control valve 56 from the closed condition to the open condition.

Operation of the control valve 56 from the closed condition to the open condition enables power steering fluid to flow from the bulk holding tank 44 through the charge pump 52 to the connector assembly 76 through the supply conduits 70 and 72. The power steering fluid entering the connector assembly 76 is free of entrained air and is filtered and at a desired temperature. This power steering fluid is conducted through the passage 102 (FIG. 2) in the fill pipe 94 to completely fill the reservoir 18.

Since the engine 16 (FIG. 1) is being operated, the power steering pump 14 is being driven. Therefore, the power steering pump 14 induces power steering fluid to flow from the reservoir 18 through the supply conduit 20 to the power steering pump. As this occurs, air in the supply conduit 20 is conducted into the power steering pump 14.

As the power steering pump 14 continues to operate, the power steering pump is completely filled with power steering fluid. As this occurs, the power steering pump induces the power steering fluid to flow through the return conduit 22 (FIG. 1) to the return fluid inlet 38 for the reservoir 18. The air in the power steering pump 14 and conduits 20 and 22 is entrained in the flow of power steering fluid conducted through the power steering pump and conduit 22 to the return fluid inlet 38 to the reservoir 18.

At this time, the connector section 122 (FIGS. 2 and 3) on the inner conduit 110 is disposed in sealing engagement with the return fluid inlet 38 to the reservoir 18. Therefore, the flow of power steering fluid, with air entrained therein, is conducted from the return fluid inlet 38 through the reservoir 18 in the inner conduit 110 (FIG. 2). Since the flow of power steering fluid and entrained air in the inner conduit 110 is separate from the power steering fluid in the reservoir 18, the entrained air is conducted through the reservoir without mixing with the power steering fluid being supplied to the reservoir through the fill pipe 94.

The power steering fluid and entrained air is conducted from the inner conduit 110 to the return conduit 78 (FIG. 1). The power steering fluid and entrained air is conducted through the control valve 56 to the upper portion of the bulk holding tank 44. As the power steering fluid and entrained air enters the upper portion of the bulk holding tank 44, the vacuum pump 86 is effective to induce the air entrained in the power steering fluid to flow into the conduit 88. This air is then exhausted from the vacuum pump 86 in a suitable manner. Since the upper portion of the holding tank 44 is evacuated by the vacuum pump 86, any air which may still be entrained in the power steering fluid will flow to the upper portion of the tank and be removed by operation of the vacuum pump 86.

When the air has been purged from the power steering system 12 and the power steering system has been filled with fluid, the inductive pickup is disconnected from the ignition system 66 for the engine 16. This results in the control valve 58 being closed by the electronic control unit 58. In addition, the electronic control unit 58 de-energizes the motors which drive the charge pump 52 and vacuum pump 86.

The connector assembly 76 is then disconnected from the reservoir 18. As the connector assembly 76 is disconnected from the reservoir 18, the fill pipe 94 and inner conduit 110 are removed from the reservoir. This results in the level of the power steering fluid in the reservoir 18 falling to a level corresponding to a desired operating level for the vehicle 10.

From the above description of the invention, those skilled in the art will perceive improvements, changes and modifications. Such improvements, changes and modifications within the skill of the art are intended to be covered by the appended claims.

Having described the invention, the following is claimed:

1. A method of filling a vehicle power steering system with fluid, said method comprising the steps of:

conducting power steering fluid to a reservoir on a vehicle; and operating a power steering pump on the vehicle to induce a flow of power steering fluid from the reservoir to the power steering pump and to induce a flow of power steering fluid from the power steering pump through the reservoir to a location spaced from the vehicle while maintaining the flow of power steering fluid from the power steering pump separate from power steering fluid in the reservoir.

2. A method as set forth in claim 1 wherein said step of operating the power steering pump to induce a flow of power steering fluid to a location spaced from the vehicle includes conducting a flow of power steering fluid with air entrained therein to a container spaced from the vehicle, and promoting removal of air from a body of power steering fluid in the container by pumping air from an upper portion of the container.

3. A method as set forth in claim 1 wherein said step of operating the power steering pump to induce a flow of power steering fluid to the power steering pump and to induce a flow of power steering fluid from the power steering pump includes initiating a flow of power steering fluid in conduits connected with the power steering pump and containing air.

4. A method as set forth in claim 1 wherein said step of operating the power steering pump to induce a flow of power steering fluid to the power steering pump and to induce a flow of power steering fluid from the power steering pump includes removing air from conduits connected with the power steering pump and removing air from the power steering pump.

5. A method as set forth in claim 1 wherein said step of operating the power steering pump to induce a flow of power steering fluid to the power steering pump and to induce a flow of power steering fluid from the power steering pump through the reservoir includes conducting a flow of air and power steering fluid through the reservoir.

6. A method as set forth in claim 1 further including the step of moving a conduit into sealing engagement with an inlet to the reservoir, said step of operating the power steering pump to induce a flow of power steering fluid to the power steering pump and to induce a flow of power steering fluid from the pump includes conducting a flow of power steering fluid from the power steering pump through the inlet to the reservoir and through the conduit while maintaining the conduit in sealing engagement with the inlet to the reservoir to thereby maintain the flow of power steering fluid from the power steering pump separate from power steering fluid in the reservoir.

7. A method as set forth in claim 1 wherein said step of conducting power steering fluid to the reservoir includes conducting a flow of power steering fluid to the reservoir through a first conduit, said step of operating the power steering pump to induce a flow of power steering fluid to the power steering pump and to induce a flow of power steering fluid from the power steering pump includes conducting the flow of power steering fluid from the power steering pump through a second conduit which extends through the reservoir and through at least a portion of the first conduit.

8. A method as set forth in claim 1 further including the steps of connecting a fluid conduit assembly with the reservoir with at least a portion of the fluid conduit assembly extending into the reservoir, said step of conducting power steering fluid to the reservoir includes filling the reservoir to a first level with power steering fluid by conducting power steering fluid through the fluid conduit assembly to the reservoir, and lowering the level of power steering fluid in the reservoir from the first level to a second level which is lower than the first level by removing the fluid conduit assembly from the reservoir after having performed said step of operating the power steering pump to induce a flow of power steering fluid from the reservoir to the power steering pump and to induce a flow of power steering fluid from the power steering pump.

9. A method as set forth in claim 1 wherein said step of operating the power steering pump to induce a flow of power steering fluid from the reservoir to the power steering pump and to induce a flow of power steering fluid from the power steering pump includes initiating operation of an engine to drive the power steering pump, said step of conducting power steering fluid to the reservoir includes conducting the power steering fluid through a valve assembly which is operable between a closed condition blocking flow of power steering fluid to the reservoir and an open condition enabling power steering fluid to flow to the reservoir, said method further including the step of operating the valve assembly from the closed condition to the open condition in response to initiation of operation of the engine to drive the power steering pump.

* * * * *